US012589931B1

(12) United States Patent
McGinnis et al.

(10) Patent No.: US 12,589,931 B1
(45) Date of Patent: Mar. 31, 2026

(54) MULTI-LAYER LIDDING FILM WITH PEEL OFF AND PUSH THROUGH PORTIONS

(71) Applicant: AMCOR FLEXIBLES NORTH AMERICA, INC., Neenah, WI (US)

(72) Inventors: Jerome E. McGinnis, Sherwood, WI (US); Heidi C. Koehler, Appleton, WI (US); Sierra Schwier, Appleton, WI (US); Denis L. Smith, Louisville, KY (US); Marcus B. Zink, Appleton, WI (US)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 0 days.

(21) Appl. No.: 19/107,895

(22) PCT Filed: Nov. 1, 2024

(86) PCT No.: PCT/US2024/054194
§ 371 (c)(1),
(2) Date: Feb. 28, 2025

(51) Int. Cl.
| | |
|---|---|
| *B65D 75/36* | (2006.01) |
| *B32B 3/26* | (2006.01) |
| *B32B 7/06* | (2019.01) |
| *B32B 27/20* | (2006.01) |
| *B32B 27/30* | (2006.01) |
| (Continued) | |

(52) U.S. Cl.
CPC ............ *B65D 75/367* (2013.01); *B32B 3/266* (2013.01); *B32B 7/06* (2013.01); *B32B 27/20* (2013.01); *B32B 27/306* (2013.01); *B32B 27/32* (2013.01); *B65D 65/40* (2013.01); *B65D 75/52* (2013.01); *B32B 2250/04* (2013.01); *B32B 2250/242* (2013.01); *B32B 2307/558* (2013.01);
(Continued)

(58) Field of Classification Search
CPC ...... B65D 75/367; B65D 65/40; B65D 75/52; B65D 2215/04; B65D 2575/362; B32B 3/266; B32B 7/06; B32B 27/20; B32B 27/306; B32B 27/32; B32B 2250/04; B32B 2250/242; B32B 2307/558; B32B 2439/00
USPC ................................................. 206/528–540
See application file for complete search history.

(56) References Cited

U.S. PATENT DOCUMENTS

| | | | | |
|---|---|---|---|---|
| 3,912,081 | A | * | 10/1975 | Haines ................. B65D 75/327 |
| | | | | 206/459.5 |
| 6,974,032 | B2 | * | 12/2005 | Intini .................... B65D 75/36 |
| | | | | 206/532 |

(Continued)

FOREIGN PATENT DOCUMENTS

| | | |
|---|---|---|
| JP | H07257639 A | 10/1995 |
| WO | 2008127485 A1 | 10/2008 |

(Continued)

OTHER PUBLICATIONS

PCT International Search Report, International Application No. PCT/US2024/0541943, issued Jan. 28, 2025, 2 pages.

*Primary Examiner* — Chun Hoi Cheung

(57) ABSTRACT

The present invention discloses a child resistant lidding film with a unique structure, comprising a peel-off portion and a push-through portion. The peel-off portion includes a first layer composed of a blend of high-density polyethylene (HDPE) and hydrocarbon resin. The push-through portion includes a second layer comprising cyclic olefin copolymer (COC). Notably, the first layer is in direct contact with the second layer, providing a child resistant and convenient peel-push opening functionality for packaging applications.

20 Claims, 4 Drawing Sheets

(51) Int. Cl.
    B32B 27/32     (2006.01)
    B65D 65/40     (2006.01)
    B65D 75/52     (2006.01)

(52) U.S. Cl.
    CPC ...... *B32B 2439/00* (2013.01); *B65D 2215/04*
                   (2013.01); *B65D 2575/362* (2013.01)

(56)                 References Cited

U.S. PATENT DOCUMENTS

| | | | | |
|---|---|---|---|---|
| 7,243,798 B2 * | 7/2007 | Buss | .................... | B65D 75/327 |
| | | | | 206/532 |
| 7,497,331 B2 * | 3/2009 | Pham | ..................... | B32B 3/266 |
| | | | | 206/532 |
| 8,329,309 B2 | 12/2012 | Leplatois et al. | | |
| 10,716,733 B2 | 7/2020 | Ingraham | | |
| 2002/0162768 A1 * | 11/2002 | Bolnick | .................... | G09F 3/10 |
| | | | | 206/532 |
| 2004/0222122 A1 * | 11/2004 | Intini | ................... | B65D 75/367 |
| | | | | 206/532 |

| | | | | |
|---|---|---|---|---|
| 2004/0245145 A1 * | 12/2004 | Urban | .................... | B65D 75/36 |
| | | | | 206/538 |
| 2006/0054529 A1 * | 3/2006 | Intini | ................. | B65D 75/5855 |
| | | | | 206/532 |
| 2006/0062946 A1 | 3/2006 | Beer et al. | | |
| 2007/0235366 A1 * | 10/2007 | Desai | ................... | B65D 75/327 |
| | | | | 206/531 |
| 2007/0289893 A1 * | 12/2007 | Williams | .......... | B65D 77/2056 |
| | | | | 206/534.1 |
| 2009/0008285 A1 | 1/2009 | Miller et al. | | |
| 2010/0170820 A1 | 7/2010 | Leplatois et al. | | |
| 2010/0314278 A1 | 12/2010 | Fonteyne et al. | | |
| 2022/0152999 A1 | 5/2022 | Priscal et al. | | |
| 2022/0388749 A1 | 12/2022 | Van Landeghem | | |

FOREIGN PATENT DOCUMENTS

| | | | |
|---|---|---|---|
| WO | 2009000403 | A1 | 12/2008 |
| WO | 2009095407 | A1 | 8/2009 |
| WO | 2010139409 | A1 | 12/2010 |
| WO | 2020004984 | A1 | 1/2020 |
| WO | 2020005061 | A1 | 1/2020 |
| WO | 2020206301 | A1 | 10/2020 |

* cited by examiner

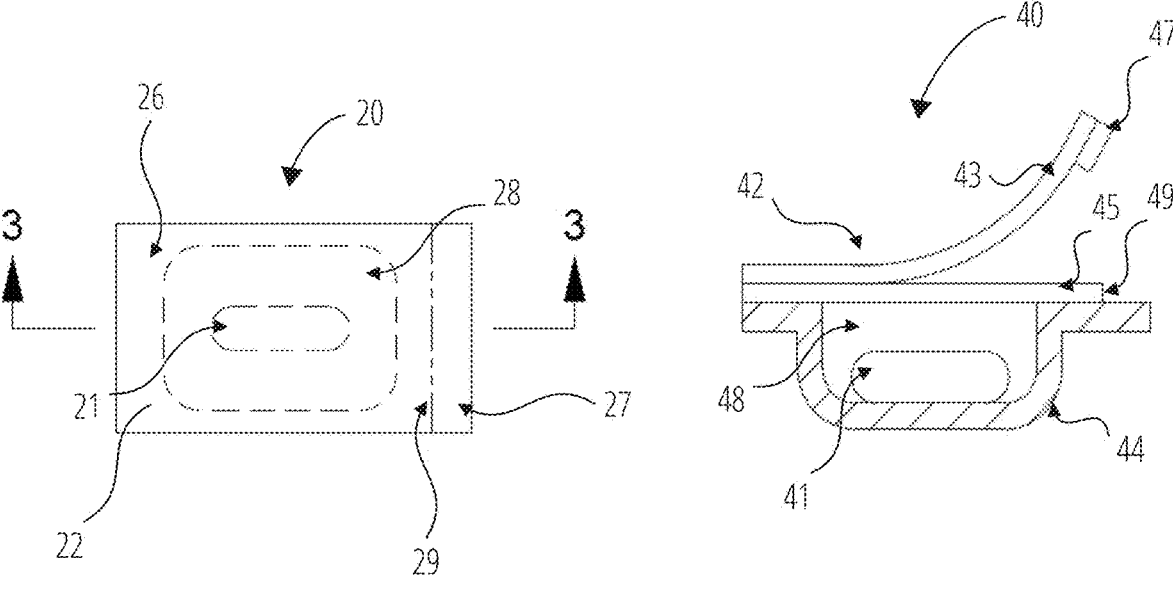
FIG. 2
FIG. 4
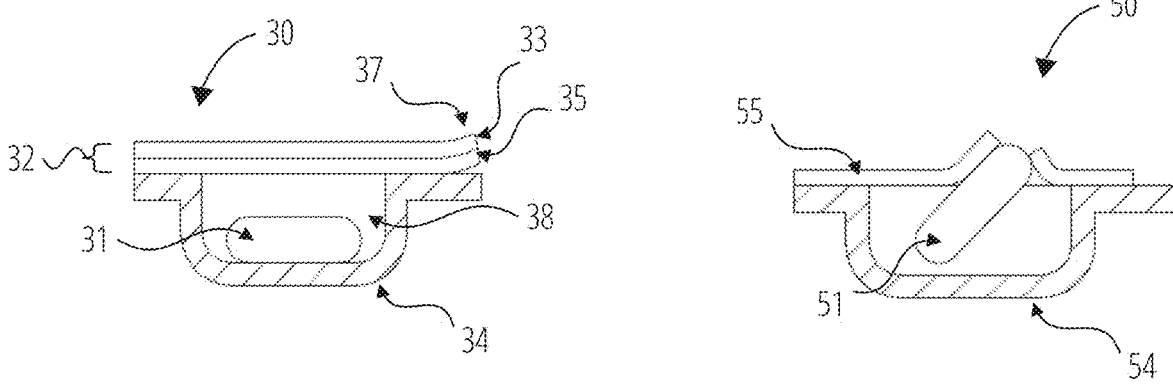
FIG. 3
FIG. 5

MULTI-LAYER LIDDING FILM WITH PEEL OFF AND PUSH THROUGH PORTIONS

TECHNICAL FIELD

This disclosure is related to recyclable packaging and lidding that provides a peel-push functionality for dispensing a product. The disclosed lidding and packaging is useful for pharmaceutical blister packaging applications.

BACKGROUND

Blister packaging is a common term used for packaging having a bottom part, typically referred to as the "blister", with a plurality of cavities formed therein (e.g., through vacuum forming or pressure forming) and having a product (e.g., a consumable tablet or pill) positioned and held therein. A cover, typically referred to as a lidding film is placed over the cavities and sealed to the blister in the areas surrounding the perimeter of each cavity, thereby hermetically sealing each cavity individually.

Generally, there are three types of blister packaging with relation to the functionality provided for the consumer to retrieve the product from its respective cavity within the scaled package: peel open type, push-through type, peel-push type and lock type. In the "push-through" type of blister package, the consumer must use a finger to push against the malleable blister film at the location of a cavity and continue pushing until the product in the cavity is pressed against and breaks through the covering lidding film. In the "peel-push" type of blister package, the consumer must first peel away an upper layer of a two layer lidding to reveal the lower layer, and second push against the malleable blister film at the location of a cavity and continue pushing until the product in the cavity is pressed against and breaks through the lower layer of the lidding film. The "peel-push" type package is considered more child-resistant than the strictly push-through type due to the extra step to access the product. In the "lock" type of blister package, the consumer can only get access to the product in the cavity by destructing the lidding material using a tool such as a pair of scissors, a knife, nails, etc.

Typical push-through blister packaging contains an aluminum foil layer to which a heat seal lacquer is applied using gravure coating process. The brittle yet maleable thin aluminum allows for the easy push through function. However, an aluminum foil layer is not desirable due to the lack of transparency and the inability to easily recycle the package after use.

Additionally, products that are sensitive to their environment use specialty designed packaging to help protect the product and extend the shelf-life to a point in time where a consumer can use the product. Often these packages are made from various types of polymers and additives that offer the properties needed to achieve "high-performance". The materials chosen for the packaging may enhance barrier properties, physical properties or aesthetics, among other things. Usually, the design of the packaging includes multiple materials to achieve several characteristics.

The combination of materials in a single packaging component or a single package can create difficulties when determining how to dispose of the packaging after use. Often, recycling is most efficient or may only be possible if the materials in the package are of the same polymer type. Efforts to use recyclable packaging materials, especially those that use a singular polymer type, result in lower performance and/or significantly higher costs. Lower performance characteristics encountered might be visual defects, less barrier and shorter shelf-life, slower speeds on packaging equipment, to name a few.

BRIEF SUMMARY

The child resistant lidding films disclosed herein provide for a recyclable peel push style blister package. When combined with an appropriate formed container (i.e., blister) that is also designed for recycling, the lidding contributes to the overall composition and must be considered when designing for recycling. The materials chosen to provide for recycling must also be appropriate to meet many other performance demands of blister packaging. Advantageously, the inventors discovered child resistant lidding films as described herein could have the properties of 1) proper peel force, 2) ease of push through, 3) child resistance, 4) fast and consistent sealing, 5) appropriate barrier, 6) optional contamination evidence and 7) recycling options.

In one aspect, a child resistant lidding film includes: a peel off portion including a first outer layer, and a first inner layer includes a blend of high-density polyethylene (HDPE) and hydrocarbon resin. The child resistant lidding film also includes a push through portion including a second outer layer having a polyethylene polymer, and a second inner layer having at least 90% cyclic olefin copolymer (COC), the second inner layer in direct contact with the first inner layer.

The child resistant lidding film may also have an average interfacial bond strength between the first inner layer and the second inner layer in a range of from 25 g/in (25 g/25.4 mm) to 400 g/in (400 g/25.4 mm) as measured by ASTM F88.

The first inner layer may include from 75% to 99% HDPE, by weight, and from 1% to 20% hydrocarbon resin, by weight.

In some aspects, the polyethylene polymer is a polyethylene plastomer polymer.

The second outer layer may further include at least one of a COC, an inorganic particle, or a high MI ethylene vinyl acetate (EVA) copolymer. The child resistant lidding film may also include a push through portion including a color concentrate. The color concentrate may be titanium dioxide particles.

The child resistant lidding film may have a puncture strength greater than 1.0 lbf (0.45 kgf) when measured according to ASTM 1306 using a ⅛ inch probe and a probe speed of 1 in/min (25.4 mm/min). The child resistant lidding film may also have a puncture strength of the push through portion in a range of from 0.1 lbf (0.045 kgf) to 1.0 lbf (0.45 kgf) when measured according to ASTM 1306 using a ⅛ inch probe and a probe speed of 1 in/min (25.4 mm/min).

In some aspects, the first outer layer may include an HDPE polymer. The first outer layer may have a first sub-layer of an adhesive and a second sub-layer selected from the group consisting of a paper, a non-woven, and an oriented film.

The child resistant lidding film may have a total composition including between 65% and 95% polyethylene polymers, by weight.

In some aspects, a blister package includes a formed container having one or more product cavity, the child resistant lidding film, and a seal connecting the second outer layer of the child resistant lidding film to the formed container.

In one aspect, a peel-push lid for a blister package includes a peel off portion having a first layer composed of high-density polyethylene (HDPE) and hydrocarbon resin, a push through portion including a second layer composed of cyclic olefin copolymer (COC), the second layer in direct contact with the first layer, and an average interfacial bond strength between the first layer and the second layer in a range of from 25 g/in (25 g/25.4 mm) to 400 g/in (400 g/25.4 mm) as measured by ASTM F88. The push through portion may further include a sealing layer composed of a polyethylene polymer.

The first layer may include from 75% to 99% HDPE, by weight, and from 1% to 20% hydrocarbon resin, by weight. The second layer may include at least 90% COC by weight. The peel off portion may further include an outer layer.

The peel-push lid may have a total composition including between 65% and 95% polyethylene polymers, by weight. The polyethylene polymer may be a polyethylene plastomer polymer.

The sealing layer may further include a COC, an inorganic particle or a high MI ethylene vinyl acetate (EVA) copolymer.

The outer layer may be composed of a HDPE polymer. The peel-push lid may also include an outer layer including a first sub-layer of an adhesive and a second sub-layer selected from the group consisting of a paper, a non-woven, and an oriented film.

The blister package may have a formed container composed of HDPE. The blister package may include a seal strength in a range of from 2,000 g/in (2,000 g/25.4 mm) to 5,000 g/in (5,000 g/25.4 mm) as measured by ASTM F88. The blister package may also have a total composition including between 65% and 95% polyethylene polymers, by weight.

Other technical features may be readily apparent to one skilled in the art from the following figures, descriptions, and claims.

BRIEF DESCRIPTION OF THE FIGURES

To easily identify the discussion of any particular element or act, the most significant digit or digits in a reference number refer to the figure number in which that element is first introduced.

FIG. 2 illustrates another top view of an embodiment of a blister package.

FIG. 3 illustrates a cross-sectional view of the embodiment of a blister package shown in FIG. 2.

FIG. 4 illustrates a cross-sectional view of an embodiment of a blister package during/after the peel action.

FIG. 5 illustrates a cross-sectional view of an embodiment of a blister package during/after the push action.

DETAILED DESCRIPTION

The child resistant lidding films disclosed herein provide for a recyclable peel push style blister package while maintaining exceptional performance in package production, package distribution, safety performance and consumer use experience. In order to deliver recyclability, the lidding is designed with significantly high amounts of polyethylene based polymers and optionally other materials that are compatible with the polyethylene recycling process.

The lidding materials described herein provide peel-push functionality. In this way, after use of the product, the package to be recycled includes at least a portion of the lidding structure. When combined with an appropriate formed container (i.e., blister) that is also designed for recycling, the lidding contributes to the overall composition and must be considered when designing for recycling.

In addition, and most challenging, the materials chosen to provide for recycling must also be appropriate to meet many other performance demands of blister packaging. Advantageously, the inventors discovered child resistant lidding films as described herein could have the properties of 1) proper peel force, 2) case of push through, 3) child resistance, 4) fast and consistent scaling, 5) appropriate barrier, 6) optional contamination evidence and 7) recycling options.
Blister Package The blister packages described herein and including the child resistant peel push lidding have significant advantages over current blister packaging. As used herein, "blister package" or "blister packaging" is a common term used for packaging having a bottom part, typically referred to as the "blister" or "formed container", with a plurality of product cavities formed therein (e.g., through vacuum forming or pressure forming) wherein a respective product piece (e.g., a consumable tablet or pill) is positioned and held therein. A cover, typically referred to as a "lidding film" is placed over and sealed to the formed container about the perimeter of each product cavity.

Figure 1A:
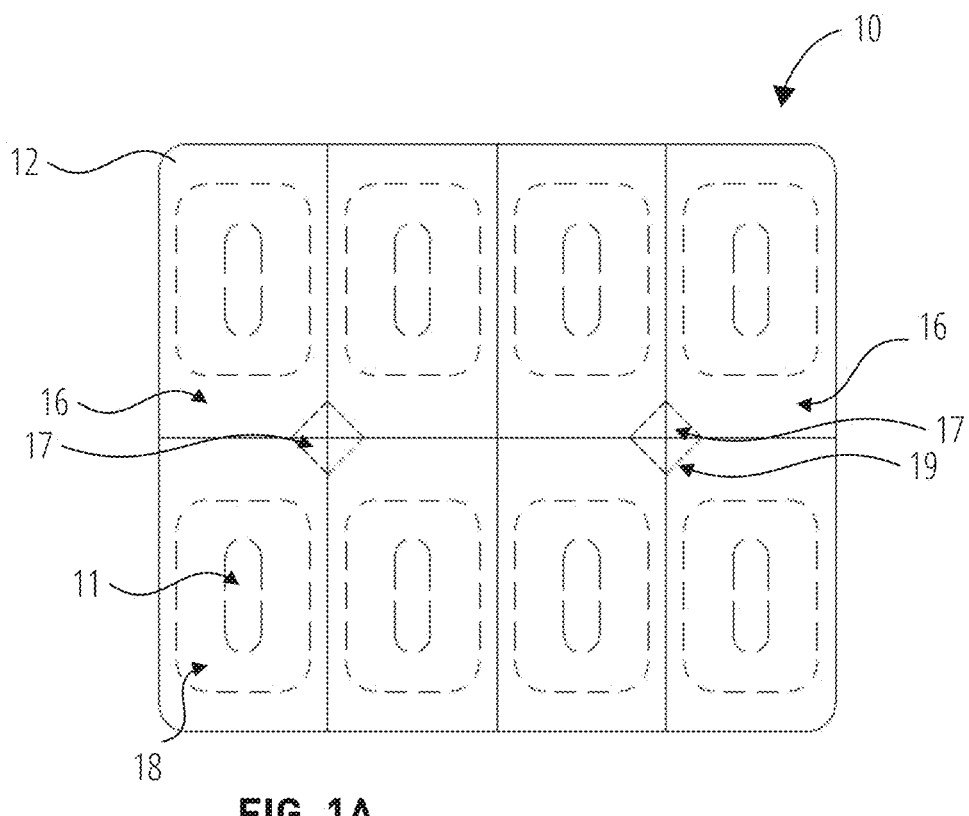
FIG. 1A illustrates a top view of an embodiment of a blister package.
Figure 1B:
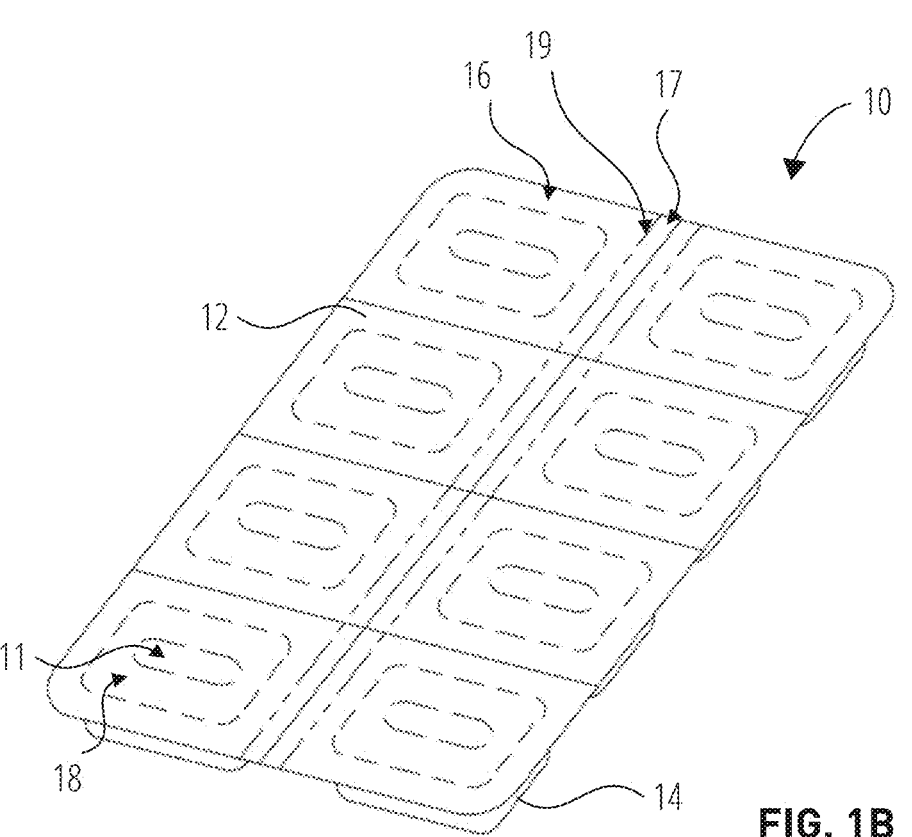
FIG. 1B illustrates perspective view of an embodiment of a blister package.

FIG. 1A and FIG. 1B show an embodiment of a blister package 10 having a child resistant lidding film 12 and a formed container 14. The formed container 14 has product cavity 18 which can be seen in the perspective view of FIGS. 1B and 1s indicated with dotted lines from the top view of the package in both FIG. 1A and FIG. 1B. The child resistant lidding film 12 covers the entire top surface of the formed container 14, thus covering the product cavities 18. This embodiment of a blister package 10 includes 8 separate cavities, separated by solid lines in the figures. The child resistant lidding film 12 and/or the formed container 14 may be perforated or scored at the location of these lines in order to allow a consumer to separate the individual cavities. The product 11 placement within each product cavity 18 is shown with dotted lines as it may be seen through the child resistant lidding film 12.

A seal 16 connects the child resistant lidding film 12 to the formed container 14 in the areas surrounding the product cavity 18. Small dash lines in FIG. 1A and dash-dot-dot lines in FIG. 1B indicate seal boundaries 19 transitioning from a sealed area (i.e., and area connected by a seal 16) to an unsealed area 17. The embodiment shown in FIG. 1A includes unsealed area 17 at the corner of each individual cavity portion. The embodiment shown in FIG. 1B includes an unsealed area 17 at the end of each individual cavity portion. These unsealed areas 17 provide a tab for a consumer to grasp the lid and begin the peel action as will be described.

As used herein, "seal" refers to an area where a surface of one packaging component, such as a lid, has been connected to another surface of the same or a different packaging component, such as a formed container. The seal may be implemented by any known means such as, but not limited to, impulse sealing, ultrasonic sealing or heat sealing. The seal of the blister packages as described herein will be discuss further in conjunction with the lidding discussion. The seal of the blister package may include all of the upper flange area (the unformed portion of the blister) except for a small, unsealed area at a corner (FIG. 1A) or a single edge (FIG. 1B) necessary to facilitate opening (to be discussed). Alternatively, the seal of the blister may be in a thin line surrounding the product cavity, thus leaving all of the edges of the blister package unsealed and available for facilitating the peeling action.

The formed container of the blister package may be composed of any type of suitable material. Ideally, the formed container is made of one or more polymeric materials such as, but not limited to, polyvinyl chloride (PVC), polyethylene terephthalate (PET), cyclic olefin copolymer (COC), polypropylene (PP), and polyethylene (PE). The formed container may be produced (i.e., thermoformed and trimmed) from a mono- or multi-layer sheet. The materials of the formed container may be chosen to provide characteristics suitable to the application, such as durability, clarity, barrier and/or flexibility. Of particular interest to the current disclosure are formed containers comprising high amounts of polyethylene, specifically high-density polyethylene (HDPE). A formed container may comprise at least 50% HDPE by weight and may include a lower density polyethylene in the sealing surface layer. Examples of formed containers that may be useful in the blister packages disclosed herein are discussed in patent documents WO20204984, WO20205061 and WO20206301, each of which is incorporated herein by reference.

The formed container may include a single product cavity or multiple product cavities. If the formed container includes multiple product cavities, the product cavities may be separable from each other. If the formed container includes multiple product cavities, a single lidding film may cover all the product cavities or separate lidding films may cover one or more product cavities. Each product cavity may contain a single unit or multiple units of product. The formed container may be configured to allow the consumer to separate the multiple product cavities, providing a blister package 20 as shown in FIG. 2. FIG. 2 shows a top view of a blister package 20 that has a singular product cavity 28. As in FIG. 1A, the child resistant lidding film 22 covers the entire top surface of the blister package 20. The product cavity 28 and the product 21 are shown in dotted lines as they would be viewed through the child resistant lidding film 22. The dash-dot-dot line is the seal boundary 29 between the seal 26 and the unsealed area 27.

The products envisioned for the blister packages disclosed herein include those that are desired to have both easy consumer access and benefit from the child resistant lidding film feature. Those products include pharmaceuticals, nutraceuticals, supplements or other products in pill, capsule or other dosing format. The product may be oxygen and/or moisture sensitive and benefit from the blister package including barrier to these. The product may also be of some other form including a medical device having some safety threat (i.e., a syringe), poison for pest control, small items of choking hazard (i.e., batteries), etc.

FIG. 3 shows a cross-sectional view of a blister package 30 essentially the same as that shown in FIG. 2. From this view, the product 31 located in the product cavity 38 of the formed container 34 can more easily be seen. The child resistant lidding film 32, now shown with a peel off portion 33 facing externally to the product 31 and a push through portion 35 located exposed to the product 31 covers the product cavity 38. The unsealed area 37 of the child resistant lidding film 32 is also evident as it is shown slightly curved away from and not attached to the formed container 34. The remaining portion of the child resistant lidding film 32 is sealed to the formed container 34.

FIG. 4 is a cross-sectional view of a blister package 40 similar to that shown in FIG. 3, but now displaying the peel off action. A consumer can grab the unsealed area 47 of the child resistant lidding film 42 to begin the peeling. At the point of the seal boundary 49 the push through portion 45 fractures and the peeling follows the interface of the child resistant lidding film 42 layers, separating the peel off portion 43 from the push through portion 45. The consumer can continue this peeling activity until the entire peel off portion 43 is removed or until at least a majority of the product cavity 48 area is exposed. Importantly, the push through portion 45 remains sealed to the formed container 44 in the area surrounding the product cavity 48. The product 41 remains secured within the product cavity 48.

FIG. 5 is a cross-sectional view of a blister package 50 similar to that shown in FIG. 3 and FIG. 4, but now displaying the push through action. After completing the peel off action, the consumer can push on the formed section of the formed container 54 (i.e., the exterior of the product cavity 58), forcing the product 51 through the push through portion 55. The product 51 can be accessed by the consumer and the blister package 50 is empty.

After use, an empty blister package may be recycled in an appropriate recycling stream or process. As used herein, the term "recyclable" or "suitable for recycling" is meant to indicate that the film or package can be converted into a new useful item, by means of reprocessing in a polyolefin recycle stream (i.e. recycling streams based on polyethylene). Reprocessing may entail washing, separating, grinding, melting and forming, among many other steps. Typically, when plastic packaging is recycled by reprocessing, the material is mechanically chopped into small pieces, melted, mixed and reformed into the new product. If multiple incompatible materials are present in the packaging, interactions occur during reprocessing causing gels, brittle material, poor appearance and generally un-usable or poorquality products. Using the term "recyclable" indicates that these drawbacks are generally not present. Qualification as a recyclable material is not regulated by any specific agencies but can be obtained from specific groups such as Association of Plastic Recyclers (APR) and How2Recycle™. Recyclable films disclosed herein may be suitable for high-density polyethylene-based recycling streams. Introduction of a recyclable film into any of these recycling by reprocessing avenues should not require additional compatibilizer.

Being suitable for recycling may be obtained by keeping the overall amount of polyethylene in the total composition of the blister package at a high level. Any additives used should be kept to a minimum. Any non polyethylene-based polymers present should be minimized or may be accompanied by compatibilizers to achieve a composition suitable for recycling. The overall density of the blister package should be maintained below 1.0 grams per cubic centimeter.

To further efforts to achieve a total composition that is suitable for recycling, some embodiments of the blister package and/or child resistant lidding film are free from polyester materials. Polyester materials are typically used in films because of the thermoforming case, stiffness and clarity. However, the presence of polyester may greatly hinder the recyclability of the blister package. In other embodiments the child resistant lidding film and/or blister package may include polyester, as a small amount may be acceptable for the recycling process.

To further efforts to achieve a total composition that is suitable for recycling, some embodiments of the blister package and/or child resistant lidding film are free from EVOH materials. EVOH is typically used in films because it is a thermoformable oxygen barrier material. However, the presence of EVOH may greatly hinder the recyclability of the film. In other embodiments the child resistant lidding film and/or blister package may include EVOH, as a small amount may be acceptable for the recycling process.

To further efforts to achieve a total composition that is suitable for recycling, some embodiments of the blister package and/or child resistant lidding film are free from polyamide materials. Polyamide materials are typically used because of the thermoforming case, durability and stiffness. However, the presence of polyamide may greatly hinder the recyclability of the film. In other embodiments the child resistant lidding film and/or blister package may include polyamide, as a small amount may be acceptable for the recycling process.

In some embodiments, polyester, polyamide and/or EVOH may only be present in the peel off portion of the child resistant lidding film and blister package. In these embodiments, the entire peel off portion may be removed prior to recycling the packaging material. In other words, the blister package and child resistant lidding film may comprise polyester, EVOH and/or polyamide prior to the peel off action but are free of these materials after the peel off process.

The blister package ideally has a total composition including at least 75%, at least 80%, at least 85%, at least 90% or at least 95% polyolefin polymers, by weight. The term "polyolefin", as used herein, refers to homopolymers or copolymers, including, for example, bipolymers, terpolymers, etc., having a methylene linkage between monomer units which may be formed by any method known to those having skill in the art. Non-limiting examples include low density polyethylene (LDPE), high density polyethylene (HDPE), ethylene alpha-olefin copolymers (EAO) preferably utilizing butene-1, hexene-1, or octene-1 comonomer with a predominate ethylene comonomer portion and including, e.g., linear low density polyethylene (LLDPE), very low density polyethylene (VLDPE), metallocene-catalyzed linear low density polyethylene (mLLDPE), plastomers, and elastomers, copolymers of ethylene and polar groups such as vinyl acetate (VA), methyl acrylate (MA), or acrylic acid (AA), e.g., ethylene vinyl acetate copolymer (EVA) or ethylene methyl acrylate copolymer (EMA) or ethylene acrylic acid copolymer (EAA), ionomers, functional group-modified polymers including, e.g., anhydride-modified polyolefins. Propylene and butene-1 homopolymers including polypropylene and polybutene-1 as well as copolymers of varying proportions of ethylene, propylene and butene-1 are useful.

The blister package ideally has a total composition including at least 75%, at least 80%, at least 85%, at least 90% or at least 95% polyethylene polymers, by weight. As described herein, the "total composition" refers to all materials encompassed therein.

Child Resistant Peel Push Lidding Film

As used herein, "child resistant lidding film" refers to a packaging component that works in conjunction with one or more other packaging components (i.e., a blister), to make the package more difficult to open for a child but may still incorporate easy-to-open functionality. Typically, a child resistant package has high puncture strength such that the package may not be breached by biting or tearing.

Figure 6:
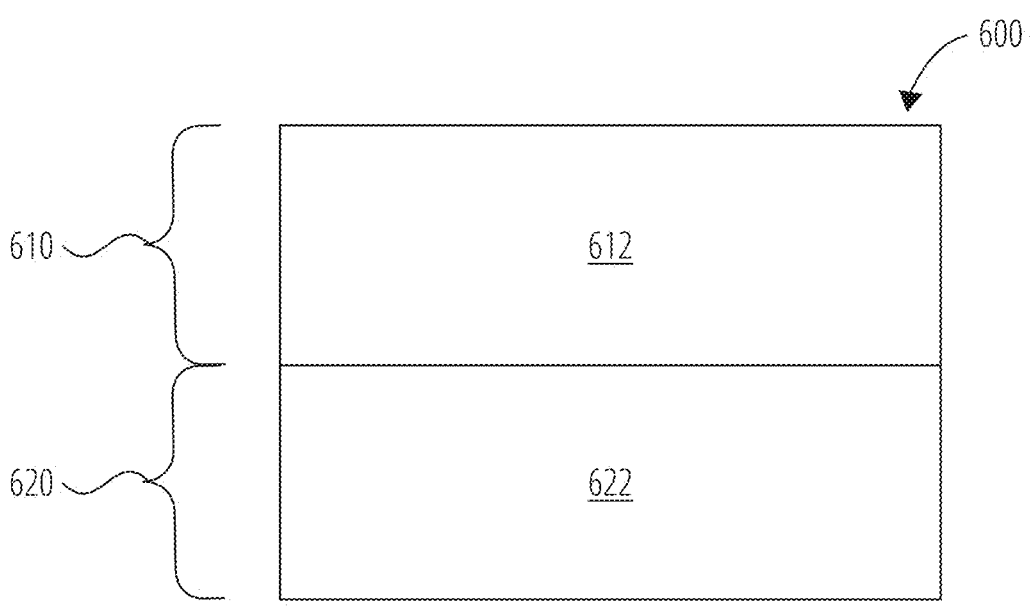
FIG. 6 illustrates a cross-sectional view of an embodiment of a peel-push lid.

FIG. 6 is a cross-sectional view of an embodiment of a peel-push lid 600, including a peel off portion 610 and a push through portion 620. The peel off portion 610 includes at least a first layer 612 and the push through portion 620 includes at least a second layer 622. Each of the portions 610 and 620 may have additional layers as long as those layers are positioned such that the first layer 612 is in direct contact with the second layer 622. As used herein, the term "directly adjacent" or "in direct contact with" means that the items are in contact with each other, without intervening material. As used herein, the term "adjacent" means that the items, such as layers of a film, are near each other, with or without intervening material, such as adhesive.

The term "layer", as used herein, refers to a building block of films that is a structure of a single material type or a homogeneous blend of materials. Films contain one or more layers that are connected to each other. In the same way, a "sub-layer" is a building block of layers. A layer or sub-layer may contain a single polymer, a blend of materials within a single polymer type (i.e. polyethylene) or a blend of various polymer types. A layer or sub-layer may contain metallic materials or other non-polymer materials and may have additives. Layers or sub-layers may be continuous with the film or may be discontinuous or patterned in comparison to the film. A film has two surfaces, opposite each other. The layer at the surface of a film is not connected to another layer of that film at that surface. As used herein, the term "inner layer" refers to one or more layers of a multilayer material that is adjacent to another layer on both sides. The surfaces of an inner layer are covered by another layer of the multilayer material. The term "outer layer" as used herein refers to one or more layers of a film that are on either major surface of the film, i.e., the layers that are not between two other layers of that film. A film has an exterior surface that becomes the exterior of a package in which the film is used. When formed into a package, the exterior surface of the film is exposed to the environment. A film has an interior surface that becomes the interior of a package in which the film is used. When formed into a package, the interior surface is used for forming seals and is exposed to the packaged product.

The first layer 612 includes a blend of high-density polyethylene (HDPE) and hydrocarbon resin. Some embodiments of the child resistant lidding film include a first layer of the peel off portion containing from 75% to 99%, or 75% to 95% or 80% to 95% HDPE, by weight. Some embodiments of the child resistant lidding film include from 1% to 20%, or 2% to 20% or 5% to 15% hydrocarbon resin, by weight. The first layer may include other polymers or additives as long as they do not interfere with the overall performance characteristics as will be described. The first layer may generally contribute to the puncture strength, appearance, peel strength and barrier of the child resistant lidding film.

As used throughout this application, the term "high-density polyethylene" or "HDPE" refers to both (a) homopolymers of ethylene which have densities from about 0.960 grams per cubic centimeter to about 0.970 grams per cubic centimeter and (b) copolymers of ethylene and an alpha-olefin (usually 1-butene or 1-hexene) which have densities from about 0.940 grams per cubic centimeter to about 0.958 grams per cubic centimeter. High-density polyethylene includes polymers made with Ziegler or Phillips type catalysts and polymers made with single site metallocene catalysts. The high-density polyethylene may be bimodal and may be pre-nucleated. Examples of pre-nucleated high-density polyethylene materials that may be suitable are Grade M6020SB available from Equistar and HPS167AB available from Nova Chemicals. An example of unnucleated high-density polyethylene materials that may be suitable is Grade M6020 available from Equistar. Examples of nucleating agent masterbatch materials that may be suitable are Hyperform® HPN nucleating agents available from Milliken.

As used herein, the phrase "hydrocarbon resin" refers to a low molecular weight product (molecular weight less than about 10,000 Daltons) produced by polymerization from coal tar, petroleum, and turpentine feed stocks. A hydrocarbon resin may comprise any of those hydrocarbon resins disclosed in U.S. Pat. No. 6,432,496, issued Aug. 13, 2002, or in U.S. Patent Application 2008/0286547, published Nov. 20, 2008, both of which are incorporated in their entireties in this application by this reference. More specifically, as a non-limiting example, the hydrocarbon resin may include petroleum resins, terpene resins, styrene resins, cyclopentadiene resins, saturated alicyclic resins or mixtures of such resins. Additionally, as a non-limiting example, the hydrocarbon resin may comprise hydrocarbon resin derived from the polymerization of olefin feeds rich in dicyclopentadiene (DCPD), from the polymerization of olefin feeds produced in the petroleum cracking process (such as crude C9 feed streams), from the polymerization of pure monomers (such as styrene, a-methylstyrene, 4-methylstyrene, vinyltoluene or any combination of these or similar pure monomer feedstocks), from the polymerization of terpene olefins (such as a-pinene, b-pinene or d-limonene) or from a combination of such. The hydrocarbon resin may be fully or partially hydrogenated. Specific examples of hydrocarbon resins include but are not limited to Piccolyte® S135 polyterpene resin or Piccotac™ 1115 hydrocarbon resin, Eastotac™ H-142W (hydrogenated aliphatic hydrocarbon resin), Plastolyn™ R1140 (amorphous hydrocarbon resin), Plastolyn™ F1120 (amorphous hydrocarbon resin) or Regalite™ T1140 (hydrogenated hydrocarbon resin), each available from Eastman Chemical Company (Kingsport, Tenn.), and Arkon™ P-140 (hydrongenated hydrocarbon resin) available from Arakawa Chemical Industries, Limited (Osaka, Japan).

The second layer 622 includes at least 90% or 95% or 100% cyclic olefin copolymer (COC). As used herein, the term "cyclic olefin copolymer" or "COC" refers to a class of polymeric materials based on cyclic olefin monomers and ethanc. Ethylene/norbornene copolymers are known commercially as cyclic olefin copolymers, "COC," with one or more different cyclic olefin units randomly or alternately attached to the ethylene polymer backbone. In general, COCs exhibit a high glass transition temperature (greater than 50° C.), optical clarity, low heat shrinkage, low moisture absorption and low birefringence. These materials may be produced by a number of polymerization techniques which may include chain polymerization of cyclic monomers such as 8,9,10-trinorborn-2-ene (norbornene) of 1,2,3,4,4a,5,8,8a-octa-hydro-1,4:5,8-dimethanonaphthalene (tetracyclododecene) with ethane; or ring-opening metathesis of various cyclic monomers followed by hydrogenation. Examples of commercially available COC which may be useful in this application include, but are not limited to, the TOPAS® COC grades available from Polyplastics, such as 8007F-04, 8007F-600, 6013-F04 or 5013F-04.

The composition of the first layer and the second layer provide for a peel off action that is neither too easy, wherein the peel off portion may become unattached prematurely, nor too difficult, wherein the consumer struggles to remove the peel off portion of the child resistant lidding film. The case of which the layers may be separated may be measured by the average interfacial bond strength. As used herein, the term "bond strength" or "peel force" refers to the force required to separate a multilayer material at a specific interface or position. Measurement of this force can be determined using the standard method ASTM 88. It is known that this measurement not only relies on the composition of each layer, the process by which the layers were produced, but also the properties of the entire laminate including the thickness and/or stiffness thereof. It remains a useful measurement to compare like materials. In the particular example of a child resistant lidding film that includes a peel-push functionality, the bond strength is a very important characteristic. If the bond strength (i.e., peel force) is too high, the package becomes too difficult to open for some consumers. If the bond strength is too low, the outer ply may separate prior to opening, removing the child resistant element of the packaging. Upon measuring the bond strength, the values measured typically include a peak value that is found at the initial separation of the materials and then a lower, more consistent value across the remaining portion of the test length. As used herein, the "average interfacial bond strength" refers to the average value of the lower, more consistent measurements, removing the peak strength from the measurement set.

The average interfacial bond strength between the first layer and the second layer (or between the peel off portion and the push through portion) may be at least 25 g/in, at least 50 g/in or at least 75 g/in. Bond strength lower than these values may result in a peel off portion that falls away with very little effort, potentially resulting in premature peeling. The average interfacial bond strength between the first layer and the second layer (or between the peel off portion and the push through portion) may be less than 150 g/in, less than 200 g/in, less than 300 g/in or less than 400 g/in. Bond strength greater than these values may result in a peel off portion that is too difficult to peel manually. For example, the average interfacial bond strength may be in a range of from 25 g/in to 400 g/in. Some embodiments of the blister package or the child resistant lidding film may have an average interfacial bond strength in a range of from 50 g/in to 200 g/in or from 50 g/in to 150 g/in.

The puncture strength of the child resistant lidding film is critical to the safety of the blister package in preventing unwanted access to the product therein. As used herein, "puncture strength" refers to a materials ability to resist breaking or otherwise failing against a localized force. Puncture strength may be measured by a standard test. Herein, the puncture strength is measured following ASTM 1306, specifically using a ⅛" probe and a probe speed of 1 inch per minute. Accordingly, the puncture strength of the child resistant lidding film may be greater than 1.0 lbf (0.45 kgf), in a range of from 1.0 lbf (0.45 kgf) to 10.0 lbf (4.5 kgf) or in a range of from 2.0 lbf (0.91 kgf) to 10.0 lbf (4.5 kgf).

The puncture strength of the push through portion of the child resistant lidding film is critical to the case of accessing the product. The composition of the layers within the push through portion may dictate the puncture strength and should be designed to easily fracture upon pressure from the product. The puncture strength of the push through portion may be in a range from 0.1 lbf (0.045 kgf) to 1.0 lbf (0.45 kgf) or in a range from 0.1 lbf (0.045 kgf) to 0.8 lbf (0.36 kgf).

In addition to the measured puncture force, one can also evaluate the performance of a push through portion by analyzing the displacement at maximum, also identified in ASTM 1306. In some embodiments, a good displacement at maximum is less than 0.3 inches.

The thickness of the child resistant lidding film may be in a range of from 1 mil (25.4 micron) to 5 mil (127 micron) or from 1 mil (25.4 micron) to 4 mil (101.6 micron). The thickness of the peel off portion may be in a range of from 1 mil (25.4 micron) to 4 mil (101.6 micron) or from 1 mil (25.4 micron) to 2 mil (50.8 micron). The thickness of the push through portion may be in a range of from 0.1 mil (2.54 micron) to 2 mil (50.8 micron) or from 0.1 mil (2.54 micron) to 1 mil (25.4 micron).

The child resistant lidding film may be printed with graphics or directions. The ink may be located at any position within the child resistant lidding film and optimal positions will be discussed with regard to specific embodiments.

Figure 7:
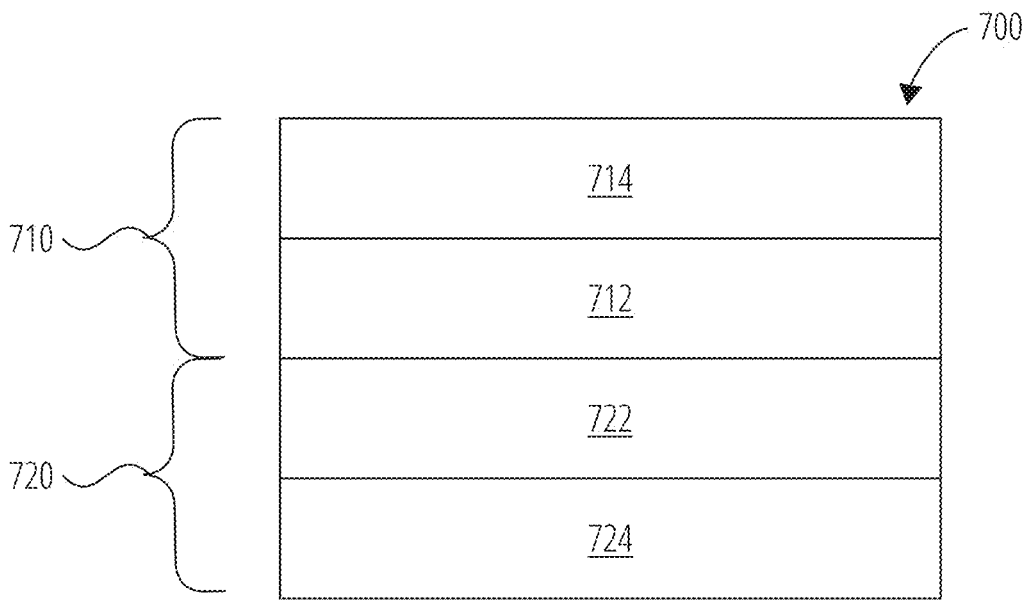
FIG. 7 illustrates a cross-sectional view of an embodiment of a peel-push lid.

FIG. 7 is a cross-sectional view of an embodiment of a peel-push lid 700. In this embodiment the peel off portion 710 includes a first layer 712 which has the same composition and properties as the first layer 612, and an outer layer 714. In this embodiment the push through portion 720 includes a second layer 722 which has the same composition and properties as the second layer 622, and a sealing layer 724. The first layer 712 is directly connected to the second layer 722 and the two layers have an average interfacial bond strength as previously discussed.

The outer layer 714 is the exterior of the child resistant lidding film, exposed to the environment when attached to a blister and formed into a blister package. The outer layer 714 may be providing puncture resistance (i.e., high puncture strength) and may also provide a surface for printing. As noted previously, printing ink may be located in any location of the child resistant lidding film including on the exterior surface of the outer layer 714 or between the outer layer 714 and the first layer 712.

The outer layer 714, the first layer 712, the second layer 722 and the sealing layer 724 may be attached to each other by any means. The first layer 712 and the second layer 722 must be in direct contact with each other and must have an average interfacial bond strength as discussed above. The outer layer 714 may be attached by an adhesive layer, another layer, or may be directly adhered to the first layer 712. The sealing layer 724 may be attached by an adhesive layer, another layer, or may be directly adhered to the second layer 722. Some or all of the layers may be coextruded together. Some of the layers may be attached by adhesive lamination. As used herein, the term "adhesive" refers to a polymeric material serving a primary purpose or function of adhering two surfaces to one another. In the present invention, the adhesive may adhere one film layer surface to another film layer surface or one area of a film layer surface to another area of the same film layer surface. The adhesive may comprise any polymer, copolymer or blend of polymers having a polar group thereon, or any other polymer, homopolymer, copolymer or blend of polymers including modified and unmodified polymers, e.g., grafted copolymers, which provide sufficient interlayer adhesion to adjacent layers comprising otherwise nonadhering polymers. The adhesive may include water-soluble adhesives, radiation curable or heat-curable adhesives, hot melt adhesives, and pressure sensitive adhesives. Examples of these adhesive materials include polyacrylates, acrylic emulsions, polyurethanes, polyamides, reaction products of polyamide with vegetable oil acids, epoxies, ethyleneamines, polysiloxanes, silicone rubber, polyalkylene glycols, polyesters, sulfopolyesters, etc. Adhesives in the present invention may include coextruded polymeric layers. In addition, the adhesives conform to the compositional requirements of the U.S. Food and Drug Administration Code of Federal Regulations, Title 21, 175.105, Adhesives which is incorporated, herein in its entirety, by reference. Specific examples of suitable adhesives for use in the present invention are supplied by Rohm and Haas Company, Philadelphia, Pa., U.S.A., and are sold under the trade name Robond™ L-90D and Robond™ L-100.

The outer layer 714 may include HDPE, such as more than 90% HDPE or 100% HDPE. The outer layer 714 may contain HDPE if the blister package is designed such that the consumer does not completely remove the peel off portion 710. With a composition including HDPE, the entire peel-push lid may be recyclable and no portion of the blister package is waste. Additionally, the choice of an HDPE containing outer layer has an advantage that it may be at least partially clear, allowing the consumer to see the product within the blister package.

Other choices for the outer layer 714 include but are not limited to a paper, a non-woven, and an oriented film.

The sealing layer 724 includes a polyethylene polymer and provides for a strong seal strength to the blister package. The seal strength should be high enough that the sealing layer of the peel-push lid cannot be manually peeled away from the blister, providing for child resistance. The seal strength of the peel-push lid to the blister should be at least higher than the average interfacial bond strength so that when a consumer pulls the unsealed area of the peel-push lid, the failure and peeling occurs at the interface between the peel off portion and the push through portion (i.e., between the first and second layers).

The sealing layer may have a composition including at least 80%, at least 90% or 100% polyethylene, by weight. As used herein, "polyethylene polymer" refers to a polymer whose basic structure is characterized by the chain —(CH2-CH2-)n. As used herein, the term "polyethylene" includes homopolymers and copolymers of ethylene. Polyethylene homopolymer is generally described as being a solid which has a partially amorphous phase and partially crystalline phase with a density of between 0.870 to 0.980 grams per cubic centimeter. The relative crystallinity of polyethylene is known to affect its physical properties. The amorphous phase imparts flexibility and high impact strength while the crystalline phase imparts a high softening temperature and rigidity. In some embodiments of the peel-push lid, the polyethylene polymer is a polyethylene plastomer polymer.

In addition to the polyethylene polymer or the polyethylene plastomer polymer, the sealing layer 724 may also include COC, an inorganic particle or a high MI ethylene vinyl acetate (EVA). As discussed earlier, the push through portion 720 should have a composition that allows for easy removal of the product and thus a lower puncture strength. The addition of these materials to the sealing layer 724 may increase the puncture case (i.e., lower puncture strength) without disrupting the recyclability of the overall peel-push lid or blister package.

The inorganic particle may be of any type typically known to be used in polymer extrusion systems, such as, but not limited to talc, calcium carbonate and/or titanium dioxide particles. The sealing layer may include up to 20% inorganic particle, up to 15% inorganic particle or up to 10% inorganic particle.

As used herein, the high MI ethylene vinyl acetate (EVA) copolymer may have an MI in a range of from 10 to 40 or from 20 to 40.

Figure 8:
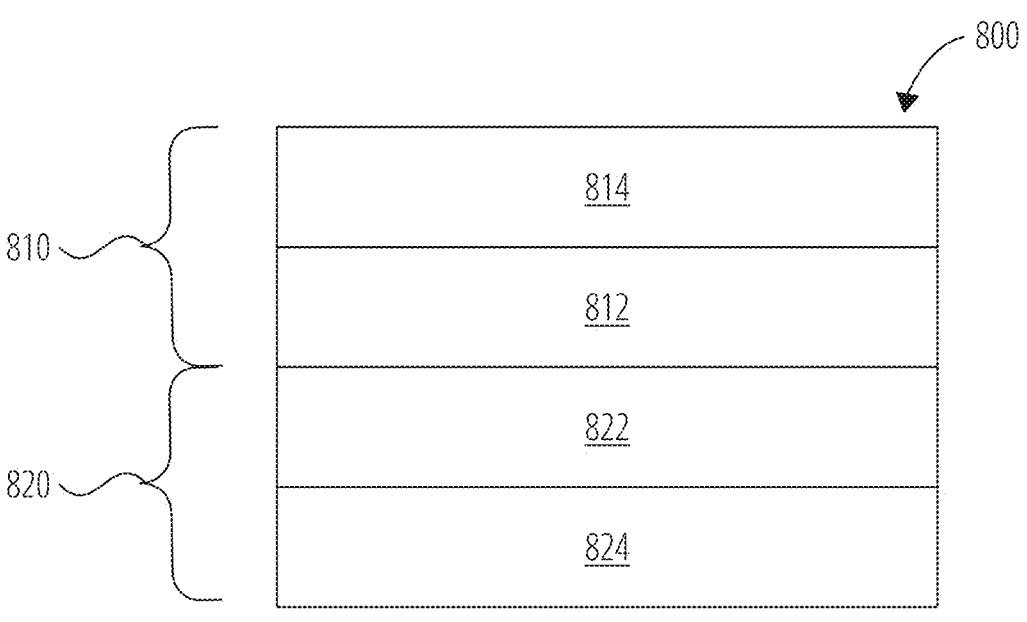
FIG. 8 illustrates a cross-sectional view of an embodiment of a child resistant lidding film.
Figure 9:
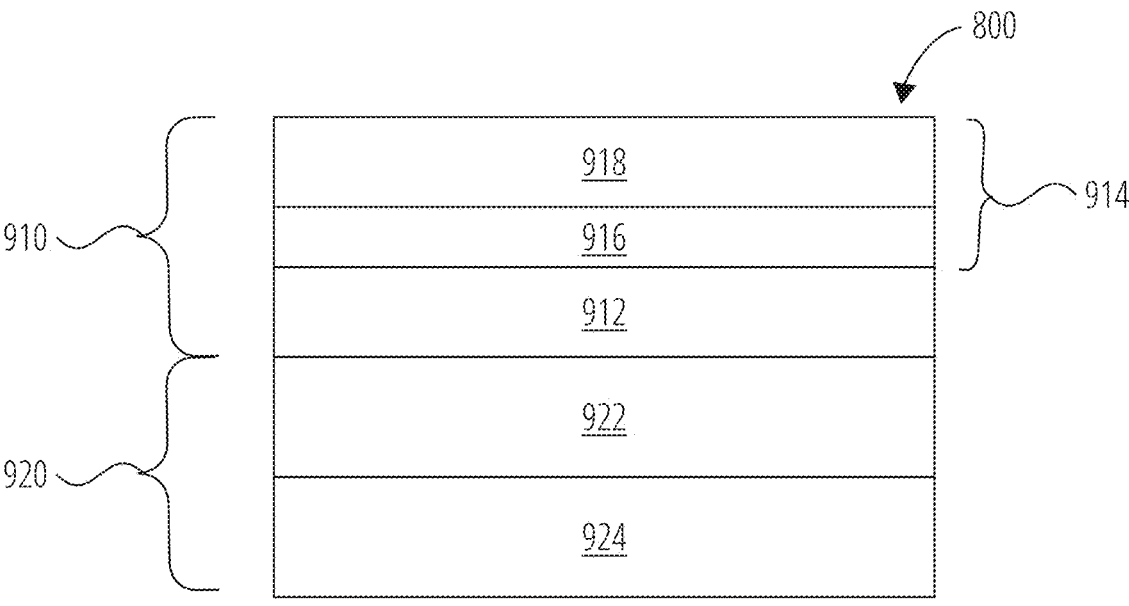
FIG. 9 illustrates a cross-sectional view of an embodiment of a child resistant lidding film.

FIG. 8 and FIG. 9 show additional embodiments of child resistant lidding films 800 and 900, respectively. With reference to FIG. 6 and FIG. 7, each child resistant lidding film (or peel-push lid) 600, 700, 800 and 900 include a peel-off portion 610, 710, 810 and 910 in direct contact with a push through portion 620, 720, 820 and 920. Puncture strength requirement of the overall child resistant lidding film 800, 900 is the same as that for 600 and 700. Similarly, the puncture strength requirement of the push through portion 820, 920 is the same as that for 620 and 720.

Peel off portion 810 includes a first inner layer 812 and a first outer layer 814 which have the same composition and characteristics as first layer 712 and outer layer 714, respectively. Push through portion 820 includes a second inner layer 822 and a second outer layer 824 which have the same composition and characteristics as second layer 722 and scaling layer 724, respectively. The first inner layer 812 is directly connected to the second inner layer 822.

In the embodiment of FIG. 9 the peel off portion 910 includes a first inner layer 912 and a first outer layer 914. First outer layer 914 includes a first sub-layer 916 and a second sub-layer 918. The first sub-layer 916 may include an adhesive (i.e., it may be an adhesive layer). The second sub-layer 918 may be the exterior of the package and may be selected to facilitate recycling such as HDPE and/or may be selected to facilitate child resistance, such as a paper, a non-woven, or an oriented film. In this embodiment push through portion 920 includes a second inner layer 922 and a second outer layer 924. The first inner layer 912 is directly connected to the second inner layer 922.

In some embodiments of the peel-push lid (i.e., the child resistant lidding film), the push through portion includes a color concentrate. As used herein, "color concentrate" refers to dyes or particles that may be added to a polymer matrix in order to change the appearance and make the material more visible. The change in color may be accompanied by a change in clarity. An example of a color concentrate often used in polymer packaging is titanium dioxide particles which provide an opaque white appearance. The color concentrate makes the push through portion easier to see and is ideally a contrasting color to the product inside. When the product is pushed through, the consumer can more readily see not only the product but also any remnants of the push through portion that may have errantly become loose and attached to the product. The push through portion may be colored and transparent or colored and opaque.

In some embodiments of the child resistant lidding film, the sealing layer and/or the first inner layer include titanium dioxide particles, rendering the push through portion white and opaque. The particles may also assist with lowering the puncture strength of the push through portion.

Some embodiments of the child resistant lidding film include a total composition including between 65% and 95% polyethylene polymers, by weight. As described herein, the "total composition" refers to all materials encompassed therein.

Examples and Data

The following example films and comparative films were produced using a multilayer blown film extrusion process. Each film was evaluated for effectiveness as a child resistant lidding film for a blister package application. The structure and composition of each film is shown in a table followed by the resulting characteristics and performance.

Within each table, the rows describe each layer, in order. The sealant side is indicated. The composition is given in percentage of a given layer, by weight. The last column gives a ratio of the thickness of each layer compared to the overall thickness (i.e., by volume). Upon peeling, the films separated between the first inner layer and the second inner layer.

Example Film 1

TABLE 1

| Structure and Composition for Example Film 1 | | |
| --- | --- | --- |
| Sealant | 67% PE Plastomer, 23% LLDPE, 10% White Concentrate | 8% |
| Second inner layer | 100% COC | 15% |
| First inner layer | 85% HDPE, 15% hydrocarbon resin | 62% |
| Exterior | 70% HDPE, 30% COC | 15% |

Total Film Thickness = 2 mil
Total composition = 99.5% polyethylene based polymers by weight For Example Film 1, the peel off portion is the Exterior and the first inner layer, and the push through portion is the Sealant and the second inner layer. Example Film 1 exhibited excellent interfacial bond strength between the first inner layer and the second inner layer—154 g/in average interfacial bond strength. The sealing layer including a blend of polyethylene plastomer polymer, LLDPE, and white concentrate (PE with 70% TiO2 loading) exhibited excellent sealing properties but tended to be difficult to push a capsule through. Upon trying to push a capsule through the push through portion the film tended to stretch prior to breaking and may not be appropriate for some applications. Lab testing of the push through portion for puncture strength, the inventors found that the displacement at max was 0.3 inches and the puncture strength was 0.83 lbf.

Comparative Example Film 1

TABLE 2

| Structure and Composition for Comparative Example Film 1 | | |
| --- | --- | --- |
| Sealant | 48% PE Plastomer, 40% COC, 12% White Concentrate | 8% |
| Second inner layer | 100% COC | 15% |
| First inner layer | 100% HDPE | 62% |
| Exterior | 70% HDPE, 30% COC | 15% |

Total Film Thickness = 2 mil
Total composition = 99.3% polyethylene based polymers by weight Comparative Example Film 1 exhibited excessive interfacial bond strength at >500 g/in when separated at the first inner layer and second inner layer interface, resulting in a peel off portion that could not be fully removed due to tearing of the film. The sealing layer including a blend of polyethylene plastomer polymer, COC and a titanium dioxide particles masterbatch, exhibited excellent sealing properties and good push through properties. The push through portion broke easily without stretching when pushing a capsule through it. Comparative Example Film 1 failed overall due to poor peel off action but did demonstrate a good composition for the push through portion for some applications.

Example Film 2

TABLE 3

| Structure and Composition for Example Film 2 | | |
| --- | --- | --- |
| Sealant | 40% PE Plastomer, 35% COC, 12% White Concentrate, 13% LLDPE | 8% |
| Second inner layer | 100% COC | 15% |

TABLE 3-continued

| Structure and Composition for Example Film 2 | | |
| --- | --- | --- |
| First inner layer | 85% HDPE, 15% hydrocarbon resin | 62% |
| Exterior | 70% HDPE, 30% COC | 15% |

Total Film Thickness = 2 mil
Total composition = 99.3% polyethylene based polymers by weight Example Film 2 is similar to Comparative Example Film 1 but now using the HDPE and hydrocarbon resin blend in the first inner layer. Example Film 2 exhibited good interfacial bond strength (average interfacial bond strength=89 g/in) when peeling between the first inner layer and the second inner layer. The sealing layer including a blend of polyethylene plastomer polymer, COC and a titanium dioxide particles masterbatch, exhibited excellent sealing properties and good push through properties. The push through portion broke easily without stretching when pushing a capsule through it. Measuring the push through portion found a displacement at max of 0.2 inches and a puncture strength of 0.6 lbf.

Comparative Example Film 2

TABLE 4

| Structure and Composition for Comparative Example Film 2 | | |
| --- | --- | --- |
| Sealant | 66% PE Plastomer, 34% LDPE | 20% |
| Inner layer | 85% HDPE, 15% hydrocarbon resin | 65% |
| Exterior | 70% HDPE, 30% COC | 15% |

Total Film Thickness = 2 mil
Total composition = 100% polyethylene based polymers by weight Comparative Example Film 2 is a film which has excellent push through performance but does not have the peel off portion. The material breaks easily without stretching when pushing a capsule through it. The displacement at max is 0.12 inches and a puncture strength of 0.86 lbf. Comparative Example Film 3 demonstrates the correlation between good push through performance and the combination of a low displacement at max value and a low puncture strength.

Example Film 3

Example Film 3 was produced by adhesive laminating Example Film 2 at the exterior layer to an OPE/BOPA film to improve the overall puncture strength. Example Film 3 has good excellent puncture resistance with a displacement at max of 0.19 in and a puncture strength of 4.02 lbf, providing good child resistance prior to peeling off the peel off portion. Example 3 exhibited good interfacial bond strength between the first inner layer and the second inner layer with an average of 89 g/in. The sealing layer, including a blend of polyethylene plastomer polymer, COC and a titanium dioxide particles masterbatch, exhibited excellent sealing properties and good push through properties. After peeling, the displacement at max was 0.2 in and puncture strength was 0.6 lbf. The push through portion broke easily without stretching when pushing a capsule through it.

Example Films 4 & 5

Example Films 4 & 5 were made with the same structure and composition as Example Film 2, but with the COC replaced with a high MI ethylene vinyl acetate (EVA) and a talc masterbatch, respectively. These films performed very well.

EMBODIMENTS

Embodiment 1: A child resistant lidding film comprising: a peel off portion comprising a first outer layer; and a first inner layer comprising a blend of high-density polyethylene (HDPE) and hydrocarbon resin; and a push through portion comprising a second outer layer comprising a polyethylene polymer, and a second inner layer comprising at least 90% cyclic olefin copolymer (COC), the second inner layer in direct contact with the first inner layer.

Embodiment 2: The child resistant lidding film of Embodiment 1 wherein an average interfacial bond strength between the first inner layer and the second inner layer is in a range of from 25 g/in (25 g/25.4 mm) to 400 g/in (400 g/25.4 mm) as measured by ASTM F88.

Embodiment 3: The child resistant lidding film of Embodiment 1 or 2 wherein the first inner layer comprises in a range of from 75% to 99% HDPE, by weight, and in a range of from 1% to 20% hydrocarbon resin, by weight.

Embodiment 4: The child resistant lidding film of Embodiment 1, 2 or 3 wherein the polyethylene polymer is a polyethylene plastomer polymer.

Embodiment 5: The child resistant lidding film of any previous Embodiment wherein the second outer layer further comprises at least one of a COC, an inorganic particle, or a high MI ethylene vinyl acetate (EVA) copolymer.

Embodiment 6: The child resistant lidding film of any previous Embodiment wherein the push through portion comprises a color concentrate.

Embodiment 7: The child resistant lidding film of Embodiment 6 wherein the color concentrate comprises titanium dioxide particles.

Embodiment 8: The child resistant lidding film of any previous Embodiment further comprising a puncture strength greater than 1.0 lbf (0.45 kgf) according to ASTM 1306 using a ⅛ inch probe and a probe speed of 1 in/min.

Embodiment 9: The child resistant lidding film of any previous Embodiment wherein a puncture strength of the push through portion is comprised in a range of from 0.1 lbf (0.045 kgf) to 1.0 lbf (0.45 kgf) according to ASTM 1306 using a ⅛ inch probe and a probe speed of 1 in/min.

Embodiment 10: The child resistant lidding film of any previous Embodiment wherein the first outer layer comprises an HDPE polymer.

Embodiment 11: The child resistant lidding film of any previous Embodiment wherein the first outer layer comprises a first sub-layer comprising an adhesive and a second sub-layer selected from the group consisting of a paper, a non-woven, and an oriented film.

Embodiment 12: The child resistant lidding film of any previous Embodiment further comprising a total composition including between 65% and 95% polyethylene polymers, by weight.

Embodiment 13: A peel-push lid for a blister package comprising: a peel off portion comprising a first layer comprising high-density polyethylene (HDPE) and hydrocarbon resin; a push through portion comprising a second layer comprising cyclic olefin copolymer (COC), the second layer in direct contact with the first layer; and an average interfacial bond strength between the first layer and the second layer is in a range of from 25 g/in (25 g/25.4 mm) to 400 g/in (400 g/25.4 mm) as measured by ASTM F88.

Embodiment 14: The peel-push lid of Embodiment 13 wherein the push through portion further comprises a sealing layer comprising a polyethylene polymer.

Embodiment 15: The peel-push lid of Embodiment 14 wherein the polyethylene polymer is a polyethylene plastomer polymer.

Embodiment 16: The peel-push lid of Embodiment 14 or 15 wherein the sealing layer further comprises a COC, an inorganic particle or a high MI ethylene vinyl acetate (EVA) copolymer.

Embodiment 17: The peel-push lid of any of Embodiments 13 through 16 wherein the first layer comprises in a range of from 75% to 99% HDPE, by weight, and in a range of from 1% to 20% hydrocarbon resin, by weight.

Embodiment 18: The peel-push lid of any of Embodiments 13 through 17 wherein the second layer comprises at least 90% COC by weight.

Embodiment 19: The peel-push lid of any of Embodiments 13 through 18 wherein the peel off portion further comprises an outer layer.

Embodiment 20: The peel-push lid of Embodiment 19 wherein the outer layer comprises an HDPE polymer.

Embodiment 21: The peel-push lid of Embodiment 19 or 20 wherein the outer layer comprises a first sub-layer comprising an adhesive and a second sub-layer selected from the group consisting of a paper, a non-woven, and an oriented film.

Embodiment 22: The peel-push lid of any of Embodiments 13 through 21 further comprising a total composition including between 65% and 95% polyethylene polymers, by weight.

Embodiment 23: A blister package comprising: a formed container comprising one or more product cavity, the child resistant lidding film or peel-push lid of any previous Embodiment, and a seal connecting the second outer layer of the child resistant lidding film to the formed container.

Embodiment 24: The blister package of Embodiment 23 wherein the formed container comprises HDPE.

Embodiment 25: The blister package of Embodiment 23 or 24 further comprising a seal strength in a range of from 2,000 g/in (2,000 g/25.4 mm) to 5,000 g/in (5,000 g/25.4 mm) as measured by ASTM F88.

Embodiment 26: The blister package of Embodiment 23, 24 or 25 further comprising a total composition including between 65% and 95% polyethylene polymers, by weight.

What is claimed is:

1. A child resistant lidding film comprising:
a peel off portion comprising:
    a first outer layer; and
    a first inner layer comprising a blend of high-density polyethylene (HDPE) and hydrocarbon resin; and
a push through portion comprising:
    a second outer layer comprising a polyethylene polymer; and
    a second inner layer comprising at least 90% cyclic olefin copolymer (COC), the second inner layer in direct contact with the first inner layer.

2. The child resistant lidding film of claim 1 wherein an average interfacial bond strength between the first inner layer and the second inner layer is in a range of from 25 g/in (25 g/25.4 mm) to 400 g/in (400 g/25.4 mm) as measured by ASTM F88.

3. The child resistant lidding film of claim 1 wherein the first inner layer comprises in a range of from 75% to 99% HDPE, by weight, and in a range of from 1% to 20% hydrocarbon resin, by weight.

4. The child resistant lidding film of claim 1 wherein the polyethylene polymer is a polyethylene plastomer polymer.

5. The child resistant lidding film of claim 1 wherein the second outer layer further comprises at least one of a COC, an inorganic particle, or a high MI ethylene vinyl acetate (EVA) copolymer.

6. The child resistant lidding film of claim 1 wherein the push through portion comprises a color concentrate.

7. The child resistant lidding film of claim 6 wherein the color concentrate comprises titanium dioxide particles.

8. The child resistant lidding film of claim 1 further comprising a puncture strength greater than 1.0 lbf (0.45 kgf) according to ASTM 1306 using a ⅛ inch probe and a probe speed of 1 in/min.

9. The child resistant lidding film of claim 1 wherein a puncture strength of the push through portion is comprised in a range of from 0.1 lbf (0.045 kgf) to 1.0 lbf (0.45 kgf) according to ASTM 1306 using a ⅛ inch probe and a probe speed of 1 in/min.

10. The child resistant lidding film of claim 1 wherein the first outer layer comprises an HDPE polymer.

11. A peel-push lid for a blister package comprising:
a peel off portion comprising a first layer comprising high-density polyethylene (HDPE) and hydrocarbon resin;
a push through portion comprising a second layer comprising cyclic olefin copolymer (COC), the second layer in direct contact with the first layer; and
an average interfacial bond strength between the first layer and the second layer is in a range of from 25 g/in (25 g/25.4 mm) to 400 g/in (400 g/25.4 mm) as measured by ASTM F88.

12. The peel-push lid of claim 11 wherein the push through portion further comprises a sealing layer comprising a polyethylene polymer.

13. The peel-push lid of claim 12 wherein the polyethylene polymer is a polyethylene plastomer polymer.

14. The peel-push lid of claim 12 wherein the sealing layer further comprises a COC, an inorganic particle or a high MI ethylene vinyl acetate (EVA) copolymer.

15. The peel-push lid of claim 11 wherein the first layer comprises in a range of from 75% to 99% HDPE, by weight, and in a range of from 1% to 20% hydrocarbon resin, by weight.

16. The peel-push lid of claim 11 wherein the second layer comprises at least 90% COC by weight.

17. The peel-push lid of claim 11 further comprising a total composition including between 65% and 95% polyethylene polymers, by weight.

18. A blister package comprising:
a formed container comprising one or more product cavity, the child resistant lidding film of claim 1, and a seal connecting the second outer layer of the child resistant lidding film to the formed container.

19. The blister package of claim 18 wherein the formed container comprises HDPE.

20. The blister package of claim 18 further comprising a total composition including between 65% and 95% polyethylene polymers, by weight.

* * * * *